(12) United States Patent
Torres

(10) Patent No.: US 7,395,752 B2
(45) Date of Patent: Jul. 8, 2008

(54) COOKING APPARATUS

(75) Inventor: Georges Maurice Torres, Hout Bay (ZA)

(73) Assignee: Frymatic Systems Close Corporation, Newlands (ZA)

( * ) Notice: Subject to any disclaimer, the term of this patent is extended or adjusted under 35 U.S.C. 154(b) by 526 days.

(21) Appl. No.: 10/512,849

(22) PCT Filed: Apr. 29, 2003

(86) PCT No.: PCT/ZA03/00057

§ 371 (c)(1), (2), (4) Date: Jul. 26, 2005

(87) PCT Pub. No.: WO03/092459

PCT Pub. Date: Nov. 13, 2003

(65) Prior Publication Data

US 2006/0011070 A1   Jan. 19, 2006

(30) Foreign Application Priority Data

Apr. 30, 2002   (ZA) ................................ 02/3426

(51) Int. Cl.
*A47J 37/12* (2006.01)
(52) U.S. Cl. ............................ 99/407; 99/403; 219/430
(58) Field of Classification Search ..................... None
See application file for complete search history.

(56) References Cited

U.S. PATENT DOCUMENTS

| | | | |
|---|---|---|---|
| 3,474,726 A | 10/1969 | Curtin | |
| 4,048,473 A * | 9/1977 | Burkhart | 219/389 |
| 5,367,949 A * | 11/1994 | Nitschke et al. | 99/407 |
| 5,996,474 A * | 12/1999 | Collas et al. | 99/403 |
| 5,996,477 A * | 12/1999 | Bois et al. | 99/403 |
| 6,807,900 B2* | 10/2004 | Iori | 99/407 |
| 2003/0205028 A1* | 11/2003 | Sus et al. | 53/440 |

FOREIGN PATENT DOCUMENTS

GB     2 115 260 A     9/1983

* cited by examiner

*Primary Examiner*—J. Pelham
(74) *Attorney, Agent, or Firm*—Crowell & Moring LLP

(57) ABSTRACT

A cooking apparatus (10) is disclosed which comprises a double-shelled housing (12) with top cover (14), side walls (16) and a front plate (20) which is in the form of an arch to provide a storage space (22) underneath. A food vapours condensation chamber is located between the inner and outer shells of the housing (12) and the outer shells of the housing (12) are exposed to atmosphere so that they cool by radiation and convection. The cooking apparatus (10) further includes a fryer unit (18) which is located within an opening (24) in the front plate (20). The fryer unit (18) comprises a casing and a rotary cylindrical drum (26). The drum is devoid of an axle and is mounted by seals which bear on the periphery the drum. A plurality of parallel diametrically extending passages (30) pass through the drum (26). One end of each passage (30) is extended by a spout (32) for receiving food to be fried while the other end of each passage (30) cooperates with a basket which can then swing down into hot oil for cooking.

10 Claims, 2 Drawing Sheets

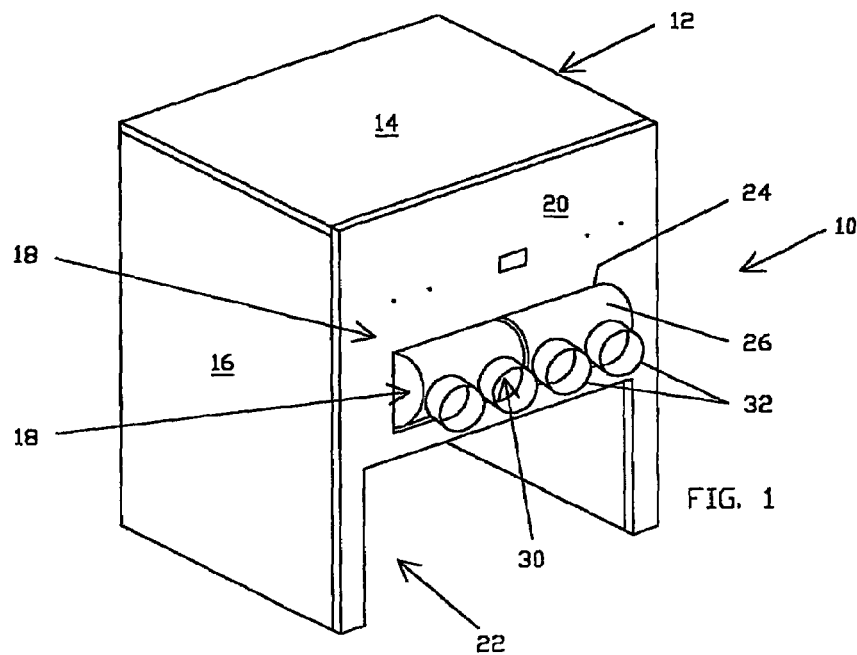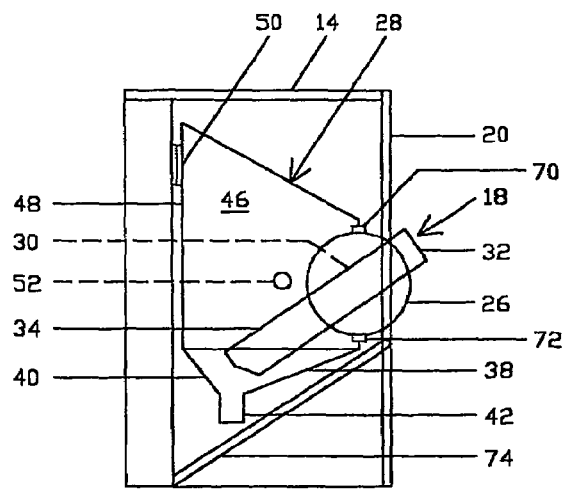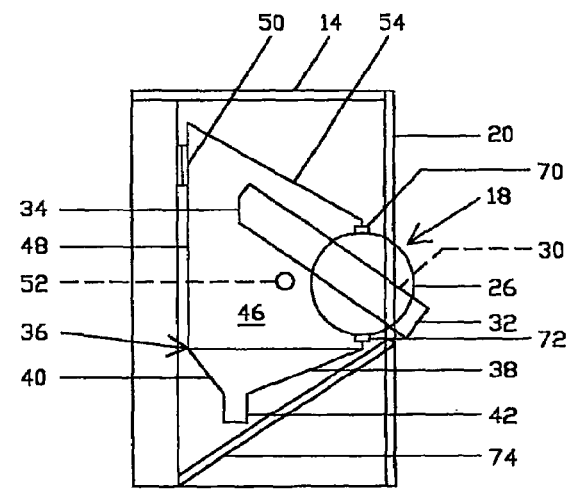

of the rotary cylindrical drum and permitting the drum to rotate whilst inhibiting motion thereof transverse to its axis, a plurality of passages passing through the rotary cylindrical drum, opposite ends of each passage opening through the surface of said first and second parts of the rotary cylindrical drum, and baskets for holding food, the baskets being at those ends of the passages which are within said casing.

COOKING APPARATUS

FIELD OF THE INVENTION

THIS INVENTION relates to cooking apparatus and specifically to apparatus for frying foods such as potato chips.

BACKGROUND TO THE INVENTION

Chip fryers are known which include baskets into which the chips are placed, the baskets then being dipped into the hot oil. In one construction the baskets form part of a structure which can be rotated between a cooking position and a filling/emptying position.

The present invention provides an improved food fryer of the type described in the preceding paragraph.

BRIEF DESCRIPTION OF THE INVENTION

According to one aspect of the present invention there is provided a food fryer unit comprising a casing having an opening therein, a rotary cylindrical drum, a first part of the drum being inside the casing and a second part of the drum protruding through said opening, combined mounting means and seals carried by said casing and extending along the opening, said mounting means and seals bearing on the cylindrical surface of the drum and permitting the drum to rotate whilst inhibiting motion thereof transverse to its axis, a plurality of passages passing through the drum, opposite ends of each passage opening through the surface of said first and second parts of the drum, and baskets for holding food, the baskets being at the ends of the passages which are within the casing.

A food fryer unit comprising a fixed lower mounting means and seal and a movable upper mounting means and seal, the upper mounting means and seal being moved away from the lower mounting means and seal to permit the drum between them to be removed.

Said upper mounting means and seal can include means which urges it towards said lower mounting means and seal to retain said drum therebetween.

According to a further aspect of the present invention there is provided cooking apparatus which comprises a double-walled housing constituted by inner and outer shells, there being a condensation chamber between the inner and outer shells of the housing and the outer shell of the housing being exposed to atmosphere so that it cools by radiation and convection, and which apparatus further comprises a fryer unit including a casing which defines a vessel for containing hot cooking oil, there being upper and lower sets of registering ports in said casing and in the inner shell of the housing whereby hot cooking vapours can escape from the fryer unit and into said condensation chamber via the upper set of ports and dewatered vapours can return via the lower set of ports.

There can be a drain valve at the lower end of said vessel for enabling used oil to be drained out. In addition there can be a drain valve at the lower end of said condensation chamber.

Said housing and said fryer unit can be separable, the ports coming into register as the fryer unit is moved into said housing.

The casing of the fryer unit of the cooking apparatus can have an opening therein and the fryer unit can include a rotary cylindrical drum, a first part of the rotary cylindrical drum being inside the casing and a second part of the rotary cylindrical drum protruding from said casing through said opening in said casing, combined mounting means and seals carried by the casing and extending along the opening, said mounting means and seals bearing on the cylindrical surface of the rotary cylindrical drum and permitting the drum to rotate whilst inhibiting motion thereof transverse to its axis, a plurality of passages passing through the rotary cylindrical drum, opposite ends of each passage opening through the surface of said first and second parts of the rotary cylindrical drum, and baskets for holding food, the baskets being at those ends of the passages which are within said casing.

In the preferred from the fryer unit comprises a fixed lower mounting means and seal and a movable upper mounting means and seal, the upper mounting means and seal being moved away from the lower mounting means and seal to permit the drum between them to be removed.

Said upper mounting means and seal can includes means which urges it towards said lower mounting means and seal to retain the drum therebetween.

BRIEF DESCRIPTION OF THE DRAWINGS

For a better understanding of the present invention, and to show how the same may be carried into effect, reference will now be made, by way of example, to the accompanying drawings in which:

FIG. 1 is an isometric view of cooking apparatus in accordance with the present invention;

FIGS. 2 and 3 are diagrammatic side elevations illustrating the apparatus in the cooking position and the filling/emptying position respectively;

DETAILED DESCRIPTION OF THE DRAWINGS

Figure 4:
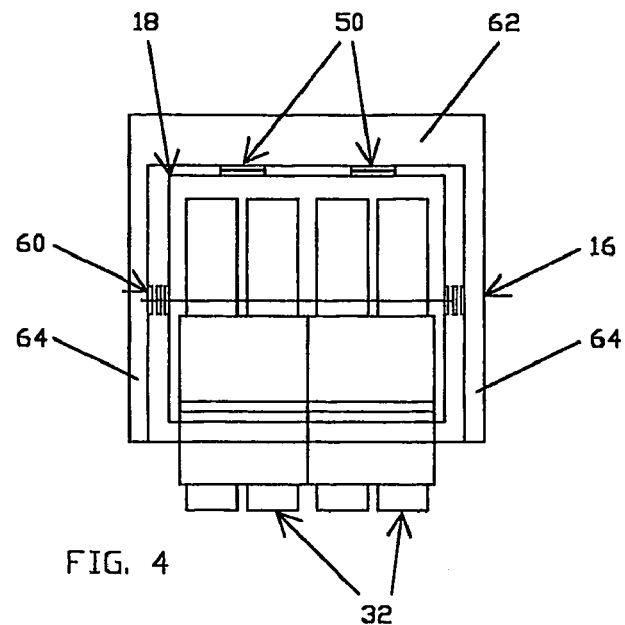
FIG. 4 is a top plan view of the apparatus.

The apparatus 10 shown in FIG. 1 comprises a housing 12 having a loose top cover 14 and side walls 16. The rear wall of the housing 12 is not visible in FIG. 1. The apparatus 10 further includes a fryer unit 18 which fits in the housing 12. The front plate 20 of the housing 12 is in the form of an arch which provides a storage space 22 underneath it. Above the storage space 22 the front wall 20 has an opening 24 in it through which the fryer unit 18 is accessible.

Referring specifically to FIG. 2, the fryer unit 18 includes a casing 28 and a rotary cylindrical drum 26. The drum 26 is positioned so that it lies partly inside the casing 28 and partly outside this casing 28. A plurality of parallel diametrically extending passages 30, four in the illustrated embodiment, pass through the drum 26. One end of each passage 30 opens through that part of the cylindrical surface of the drum 26 which is outside the fryer unit's casing 28. This end of each passage 30 is extended by a spout 32. The other end of each passage 30 opens through that part of the cylindrical surface of the drum 26 which is within the casing 28. This other end of each passage 30 is extended by a basket 34. The baskets 34 are of metal and are apertured so that hot oil can enter them when they are dipped into hot oil which is in an oil vessel 36 (see FIGS. 2, 3 and 6). The oil vessel 36 is constituted by the lower part of the casing 28.

The oil vessel 36 is bounded by inclined bottom walls 38, 40 which slope down to a trough 42. A drain valve 44 (FIG. 5) fitted to the trough 42 enables the vessel 36 to be emptied.

The casing 28 further includes side walls 46 and a rear wall 48. Two condensate exhaust ports 50 are provided in the rear wall 48 near the upper end of this wall 48. An inlet port 52 is provided in each side wall 46.

The upper end of the casing 28 is constituted by an inclined top closure 54. Thus the casing 28, when in use, is entirely closed apart from the ports 50, 52. The top closures 54 slopes up towards the ports 50.

Figure 5:
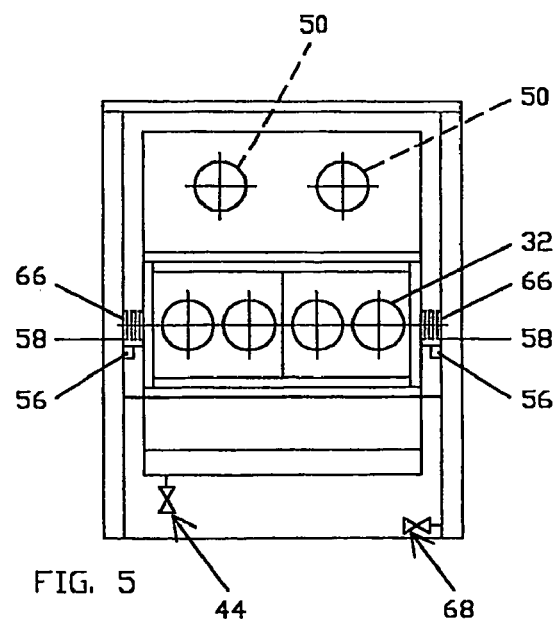
FIG. 5 is a front elevation of the apparatus.

On the inner face of each side wall 16 there is a support 56 which is horizontal and extends from front to rear (see FIG. 5). The unit 18 has rails 58 on the outer faces of the side walls 46. As the unit 18 is slid into the housing 12, after removal of the front plate 20, the rails 58 slide onto the supports 56 and hence the unit 18 hangs from the supports 56.

The rear wall of the housing 12 is designated 60 in the drawings. The rear wall 60, and also the side walls 16, are of double-shell construction. Each consequently has a space therein between its inner and outer shells. These spaces are designated 62 and 64 in FIG. 4.

The inner shells have ports therein which match the ports 50, 52 in both position and size. Bosses 66 (see FIGS. 5 and 6) encircle the ports 50, 52. The condensation chamber constituted by the inter-shell spaces 62, 64 of the side walls 16 and rear wall 60 communicates with the casing 28 via these bosses 66.

Concertina-like foil sleeves (not shown) bridge the gaps between the fryer unit 18 and the housing 12 and are fitted to the bosses 66. Hence cooking vapours cannot escape from the casing 28 into the gap between it and the housing 12.

A drain valve 68 is provided close to the lower end of the condensation chamber.

The drum 26 is not mounted on an axle but is carried by upper and lower mounting means and seals 70 and 72 (see FIGS. 2, 3 and 6) which are themselves carried by the casing 28. Each mounting means and seal 70, 72 is arcuate in cross section and each has its part-cylindrical surface in contact with the surface of the drum 26. The extent of each seal 70, 72 is such that the drum 26, whilst free to rotate in the seals 70, 72, is prevented from moving transversely to its axis of rotation.

The lower mounting means and seal 72 is fixed and the drum 26 simply rests on it. The upper mounting means and seal 70 is weighted so that it presses down on the top of the drum 26. As the drum 26 is inserted into the gap between the mounting means and seals 70, 72, the upper mounting means and seal 70 is displaced upwardly, against the action of the weight, by the drum 26. As the drum 26 reaches its final position, the mounting means and seal 70 moves down and its part cylindrical face rests on the cylindrical face of the drum 26. The mounting means and seals 70, 72 are preferably slightly offset from the vertical plane passing through the axis of the drum 26 thereby to restrain the drum 26 against accidental displacement out of the casing 28 of the unit 18.

Further seals, not shown, extend across the ends of the drum 26 to prevent leakage of vapours arising from the cooking process.

Figure 6:
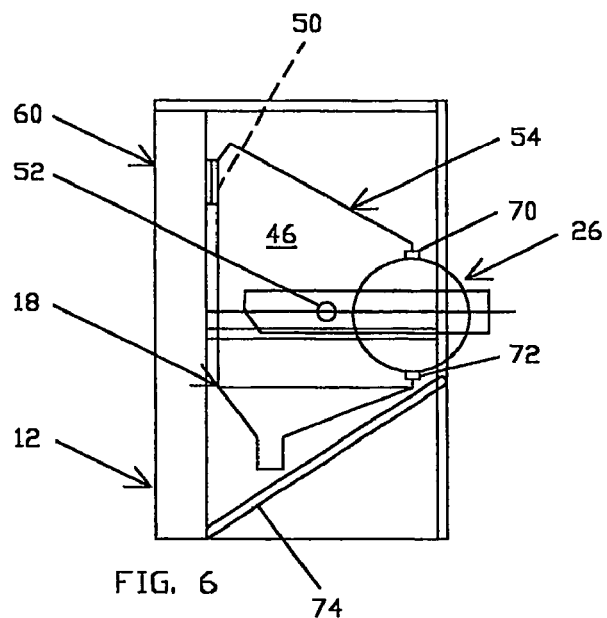
FIG. 6 is a diagrammatic side elevation showing the internal construction of the apparatus.

A protective plate 74 is provided below the vessel 36 (see FIGS. 2, 3 and 6).

In use the vessel 36 has oil poured into it and the heating elements (not shown) are switched on.

A portion of the food to be fried is placed in a paper cup (not shown) or other receptacle, and the cup is placed on one of the spouts 32. The drum 26 is at this time in the position shown in FIG. 3. It is then tilted to the position shown in FIG. 2. The food slides out of the cup and along the passage 30 into the basket 34 which simultaneously swings down into the hot oil. Once cooked, the food is drained by raising the basket 34 to a horizontal position for a short while and then retrieved by rotating the drum 26 back to the position shown in FIG. 3.

Vapours, mainly water, arising from the cooking process, escape from the casing 28 through the ports 50 and are condensed in the condensation chamber between the inner and outer shells. Vapours return to the fryer casing 28 by way of the ports 52. The construction is such that, without the use of fans, a circulatory flow is created through the spaces 62, 64 and the fryer casing 28. It will be noted that the outer shells are exposed to atmosphere and are hence cooler than the rest of the apparatus 10. The condensation chamber can be emptied by opening the valve 68.

The drum 26 can be in two or more axially aligned parts, each part having one, two or more passages 30 therethrough.

An advantage of the apparatus 10 described is that it does not require an extraction fan or circulation fan for handling cooking vapours because they circulate by convection as described above. A further advantage is that the mounting of the drum, being devoid of axles and bearings, is less complex and the drum can simply be pulled out after lifting the weighted upper seal.

The invention claimed is:

1. A food fryer unit comprising a casing having an opening therein, a rotary cylindrical drum, a first part of the drum being inside the casing and a second part of the drum protruding through said opening, combined mounting means and seals carried by said casing and extending along the opening, said mounting means and seals bearing on the cylindrical surface of the drum and permitting the drum to rotate whilst inhibiting motion thereof transverse to its axis, a plurality of passages passing through the drum, opposite ends of each passage opening through the surface of said first and second parts of the drum, and baskets for holding food, the baskets being at the ends of the passages which are within the casing.

2. A food fryer unit as claimed in claim 1 and comprising a fixed lower mounting means and seal and a movable upper mounting means and seal, the upper mounting means and seal being moved away from the lower mounting means and seal to permit the drum between them to be removed.

3. A food fryer unit as claimed in claim 2, wherein said upper mounting means and seal includes means which urges it towards said lower mounting means and seal to retain said drum therebetween.

4. Cooking apparatus which comprises a double-walled housing constituted by inner and outer shells, there being a condensation chamber between the inner and outer shells of the housing and the outer shell of the housing being exposed to atmosphere so that it cooks by radiation and convection, and which apparatus further comprises a fryer unit including a casing which defines a vessel for containing hot cooking oil, there being upper and lower sets of registering ports in said casing and in the inner shell of the housing whereby not cooking vapours can escape from the fryer unit and into said condensation chamber via the upper set of ports and dewatered vapours can return via the lower set of ports.

5. Cooking apparatus as claimed in claim 4, and which includes a drain valve at the lower end of said vessel for enabling used oil to be drained out.

6. Cooking apparatus as claimed in claim 4, and which includes a drain valve at the lower end of said condensation chamber.

7. Cooking apparatus as claimed in claim 4, wherein said housing and said fryer unit are separable, the ports coming into register as the fryer unit is moved into said housing.

8. Cooking apparatus as claimed in claim 4, wherein said casing has an opening therein and the fryer unit includes a rotary cylindrical drum, a first part of the rotary cylindrical drum being inside the casing and a second part of the rotary cylindrical drum protruding from said casing through said opening in said casing, combined mounting means and seals carried by the casing and extending along the opening, said mounting means and seals bearing on the cylindrical surface of the rotary cylindrical drum and permitting the drum to rotate whilst inhibiting motion thereof transverse to its axis, a plurality of passages passing through the rotary cylindrical drum, opposite ends of each passage opening through the surface of said first and second parts of the rotary cylindrical drum, and baskets for holding food, the baskets being at those ends of the passages which are within said casing.

9. A food fryer unit as claimed in claim 8 and comprising a fixed lower mounting means and seal and a movable upper mounting means and seal, the upper mounting means and seal being moved away from the lower mounting means and seal to permit the drum between them to be removed.

10. A food fryer unit as claimed in claim 9, wherein said upper mounting means and seal includes means which urges it towards said lower mounting means and seal to retain the drum therebetween.

* * * * *